United States Patent
Iida et al.

(10) Patent No.: US 11,046,250 B2
(45) Date of Patent: Jun. 29, 2021

(54) ELECTRONIC MIRROR SYSTEM

(71) Applicant: TOYOTA JIDOSHA KABUSHIKI KAISHA, Toyota (JP)

(72) Inventors: Tomoaki Iida, Okazaki (JP); Taichi Hasegawa, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/684,709

(22) Filed: Nov. 15, 2019

(65) Prior Publication Data

US 2020/0207270 A1    Jul. 2, 2020

(30) Foreign Application Priority Data

Dec. 28, 2018  (JP) .............................. JP2018-248002

(51) Int. Cl.
*H04N 7/18*       (2006.01)
*B60R 1/00*       (2006.01)
*H04N 5/235*      (2006.01)

(52) U.S. Cl.
CPC ............. *B60R 1/00* (2013.01); *H04N 5/2351* (2013.01); *H04N 7/183* (2013.01); *B60R 2300/602* (2013.01); *B60R 2300/8046* (2013.01)

(58) Field of Classification Search
CPC ........ H04N 5/2351; H04N 7/183; B06R 1/00; B06R 2300/602; B06R 2300/8046
USPC ........................................................ 348/148
See application file for complete search history.

(56) References Cited

U.S. PATENT DOCUMENTS

| | | | | |
|---|---|---|---|---|
| 2003/0197795 A1* | 10/2003 | Schinner | ............... | H04N 5/243 348/255 |
| 2007/0177815 A1* | 8/2007 | Yang | ........................ | B60R 1/00 382/254 |
| 2009/0251563 A1* | 10/2009 | Mochida | ............... | H04N 5/243 348/229.1 |
| 2013/0120572 A1* | 5/2013 | Kwon | ............... | B62D 15/0295 348/148 |
| 2013/0271608 A1* | 10/2013 | Hiei | .................. | H04N 5/23293 348/148 |
| 2016/0185292 A1 | 6/2016 | Asai | | |
| 2018/0198969 A1* | 7/2018 | Weber | ...................... | B60R 1/00 |

FOREIGN PATENT DOCUMENTS

JP    2016-124391 A    7/2016
JP    2019-189081 A    10/2019

* cited by examiner

*Primary Examiner* — Michael Lee
(74) *Attorney, Agent, or Firm* — Sughrue Mion, PLLC

(57) ABSTRACT

There is provided an electronic mirror system including: a measuring section that a measures a brightness of a vehicle exterior; an imaging section that captures images of rear lateral sides of a vehicle; a display section; an operation section; and a display control section that, in a case in which the brightness measured by the measuring section is less than or equal to a set threshold value, and the vehicle is operated by the operation section so as to travel rearward, switches the imaging range of the imaging section to the second imaging range, and makes a luminous intensity of a dark portion, which is a portion within the display surface of an image displayed on the display surface and whose luminous intensity is lower than a set luminous intensity, be higher than a luminous intensity of the dark portion before the vehicle travels rearward.

5 Claims, 13 Drawing Sheets

ELECTRONIC MIRROR SYSTEM

CROSS-REFERENCE TO RELATED APPLICATION

This application is based on and claims priority under 35 USC 119 from Japanese Patent Application No. 2018-248002 filed on Dec. 28, 2018, the disclosure of which is incorporated by reference herein.

BACKGROUND

Technical Field

The present disclosure relates to an electronic mirror system.

Related Art

An electronic mirror device having an imaging portion that captures images of a rear lateral side of a vehicle, and a display portion that displays the images, is disclosed in Japanese Patent Application Laid-Open (JP-A) No. 2016-124391. The display portion displays images corresponding to different imaging ranges, in cases in which the shift position of the vehicle is the forward advancing position, and in cases in which the shift position is the rearward traveling position or cases in which the shift position is the rearward traveling position and a predetermined condition is met.

In an electronic mirror system having a camera and a monitor and in which setting can be switched between a setting for daytime and a setting for nighttime, at nighttime, there are cases in which the camera gain is set to be low in order to decrease the halation that arises which respect to the headlamps of vehicles traveling behind.

However, in a state in which the camera gain is lowered at night, in a range in which an object that is a light source does not exist at the rear of the own vehicle, the luminous intensity of the image displayed on the monitor is insufficient. Therefore, the visibility of the periphery of the rear portion of the own vehicle at the time when the own vehicle is traveling rearward is poor. In this way, there is room for improvement in improving the visibility of the periphery of the rear portion of the own vehicle when the own vehicle is traveling rearward at night.

SUMMARY

In view of the above-described circumstances, the present disclosure provides an electronic mirror system that can improve the visibility of the periphery of the rear portion of the own vehicle when the own vehicle is traveling rearward at night.

An electronic mirror system of a first aspect of the present disclosure has: a measuring section that measures a brightness of a vehicle exterior; an imaging section that is configured to switch an imaging range thereof, between a first imaging range and a second imaging range that is wider than the first imaging range, and that captures images of rear lateral sides of a vehicle; a display section that displays, on a display surface, an image captured by the imaging section; an operation section that can operate the vehicle so as to advance forward or travel rearward; and a display control section that, in a case in which the brightness measured by the measuring section is less than or equal to a set threshold value, and the vehicle is operated by the operation section so as to travel rearward, switches the imaging range of the imaging section to the second imaging range, and makes a luminous intensity of a dark portion, which is a portion within the display surface of an image displayed on the display surface and whose luminous intensity is lower than a set luminous intensity, be higher than a luminous intensity of the dark portion before the vehicle travels rearward.

At the measuring section of the electronic mirror system of the first aspect, the brightness of the vehicle exterior is measured. At the operation section, the vehicle is operated so as to one of advance forward or travel rearward. At the imaging section, images of the rear lateral sides of the vehicle are captured. At the display control section, in a case in which it is nighttime when brightness measured by the measuring section is less than or equal to a set threshold value, and the vehicle is operated by the operation section so as to travel rearward, the imaging range of the imaging section is switched from the first imaging range to the second imaging range. Moreover, at the display control section, the luminous intensity of a dark portion, which is a portion within the display surface of the display section of an image displayed on the display surface and whose luminous intensity is lower than a set luminous intensity, is made to be higher than a luminous intensity of the dark portion before the vehicle travels rearward.

Here, due to the imaging range of the imaging section being switched from the first imaging range to the second imaging range that is wide, within the display surface of the image, generally, the proportion of the surface area of the portion having high luminous intensity, with respect to the entire surface area, is small as compared with that proportion before the imaging range is switched. Due thereto, the luminous intensity of the image displayed by the display section becoming excessive locally is suppressed, and therefore, the image of the display section is easy to view. Moreover, by making the luminous intensity of the dark portion of the image be higher than the luminous intensity of the dark portion before rearward traveling of the vehicle, the state of the dark portion is easily recognized. In this way, in the electronic mirror system of the first aspect, because the image of the display section is easy to view and the state of the dark portion is easy to recognize, the visibility of the periphery of the rear portion of the own vehicle when the own vehicle is traveling rearward at night can be improved.

In an electronic mirror system of a second aspect of the present disclosure, in a case in which the brightness measured by the measuring section is less than or equal to the set threshold value, and the vehicle is operated by the operation section so as to travel rearward, the display control section makes a light sensitivity of a light receiving portion that corresponds to the dark portion at the imaging section be higher than a light sensitivity of the light receiving portion that corresponds to the dark portion before the vehicle travels rearward.

At the display control section of the electronic mirror system of the second aspect, in a case in which the brightness that is measured by the measuring section is less than or equal to the set threshold value, and the vehicle is operated by the operation section so as to travel rearward, the light sensitivity of the portion, which corresponds to the dark portion, at the light receiving portion is made to be higher than the light sensitivity before rearward traveling of the vehicle. Here, the light receiving portion of the imaging section is disposed at the most upstream side of the transmission path of image information from the imaging section to the display section. Namely, by making the light sensitivity high at the light receiving portion that is disposed furthest upstream in the path of transmission of image information, the resolution of the image information that is transmitted downstream is high, and therefore, the visibility of the dark portion at the display section can be improved.

In an electronic mirror system of a third aspect of the present disclosure, in a case in which the brightness measured by the measuring section is less than or equal to the set threshold value, and the vehicle is operated by the operation section so as to travel rearward, the display control section corrects information of a first luminous intensity of the dark portion before the vehicle travels rearward, to information of a second luminous intensity of the dark portion such that the second luminous intensity becomes higher than the first luminous intensity, and thereafter, outputs corrected information to the display section.

In the electronic mirror system of the third aspect, in a case in which the brightness measured by the measuring section is less than or equal to the set threshold value, and the vehicle is operated by the operation section so as to travel rearward, the display control section corrects information of a first luminous intensity of the dark portion before rearward traveling of the vehicle to information of the second luminous intensity of the dark portion, such that the second luminous intensity becomes higher than the first luminous intensity. Here, the setting of the correction from the information of the first luminous intensity to the information of the second luminous intensity is carried out at the display control section that is different than the imaging section, and it is difficult for this setting of the correction to be affected by the structure of the imaging section. Therefore, the setting of the correction of the luminous intensity can be carried out freely at the display control section.

In accordance with the present disclosure, there can be provided an electronic mirror system that can improve the visibility of the periphery of the rear portion of the own vehicle when the own vehicle is traveling rearward at night.

BRIEF DESCRIPTION OF THE DRAWINGS

Exemplary embodiments of the present disclosure will be described in detail based on the following figures, wherein.

DETAILED DESCRIPTION

First Embodiment

Figure 1:
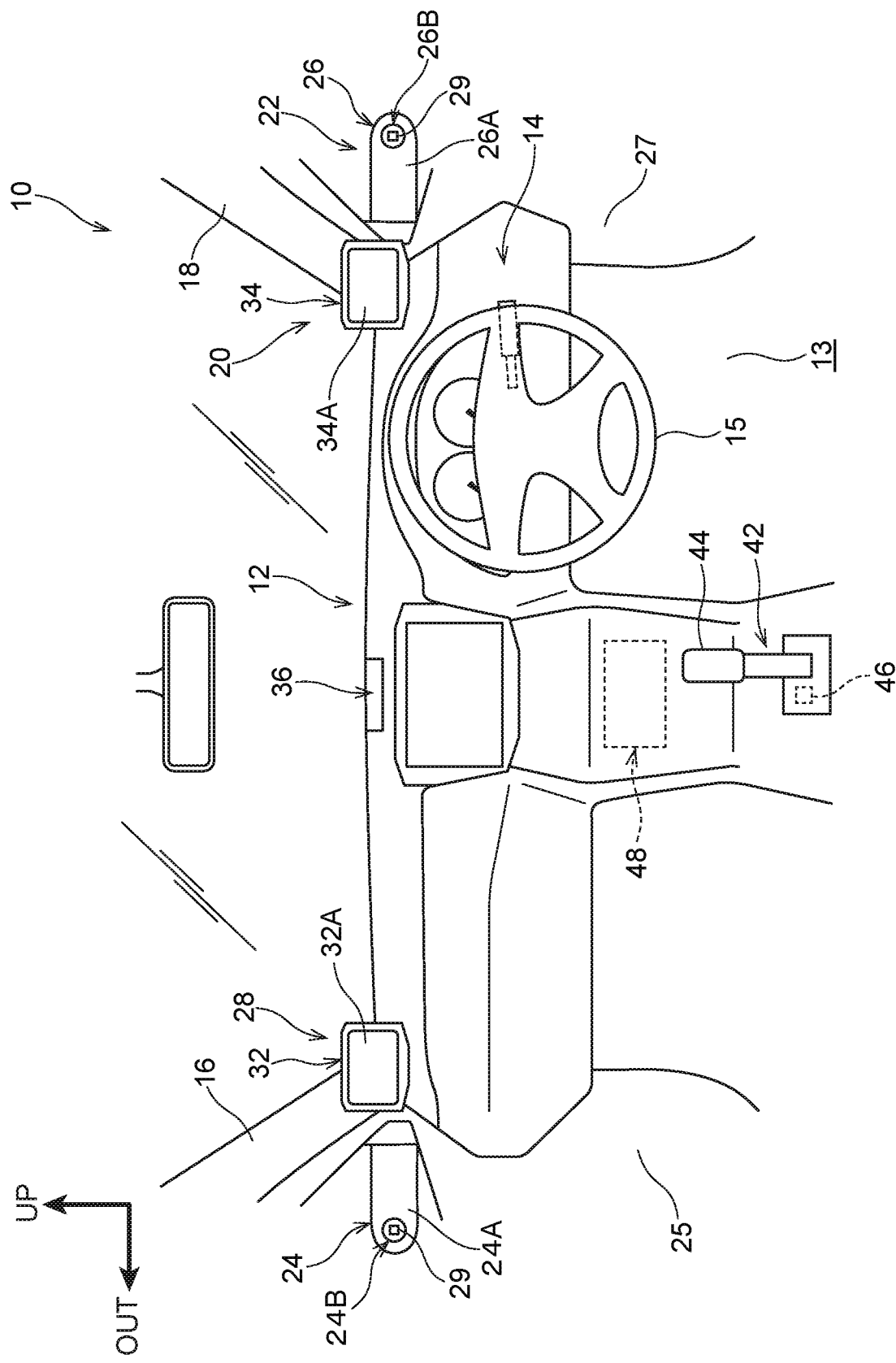
FIG. 1 is a schematic drawing showing a state in which an instrument panel of a vehicle, which has a display system relating to a first embodiment, is seen from a vehicle cabin inner side.

A portion of a vehicle 10, to which is applied a display system 20 that serves as an example of an electronic mirror system relating to a first embodiment, is shown in FIG. 1. Note that arrow UP indicates the vehicle vertical direction upper side, and arrow OUT indicates the vehicle transverse direction outer side. An unillustrated vehicle longitudinal direction is the direction orthogonal to the vehicle vertical direction and the vehicle transverse direction. Hereinafter, when description is given by merely using longitudinal, vertical and left-right directions, they refer to the longitudinal of the vehicle longitudinal direction, the vertical of the vehicle vertical direction, and the left and the right of the vehicle transverse direction when facing in the advancing direction, unless otherwise indicated. Structural elements and portions that are the same as or equivalent to one another in the respective drawings are denoted by the same reference numerals. Further, the dimensional ratios in the drawings are exaggerated for convenience of explanation, and there are cases in which they differ from actual ratios.

The vehicle 10 is structured to include a vehicle body 12, an instrument panel 14, a steering wheel 15, a left front pillar garnish 16, a right front pillar garnish 18, a left front side door 25, and a right front side door 27. The vehicle body 12 has a vehicle cabin 13. An unillustrated engine and millimeter wave radar are installed in the vehicle 10.

[Hardware Structures]

Figure 2:
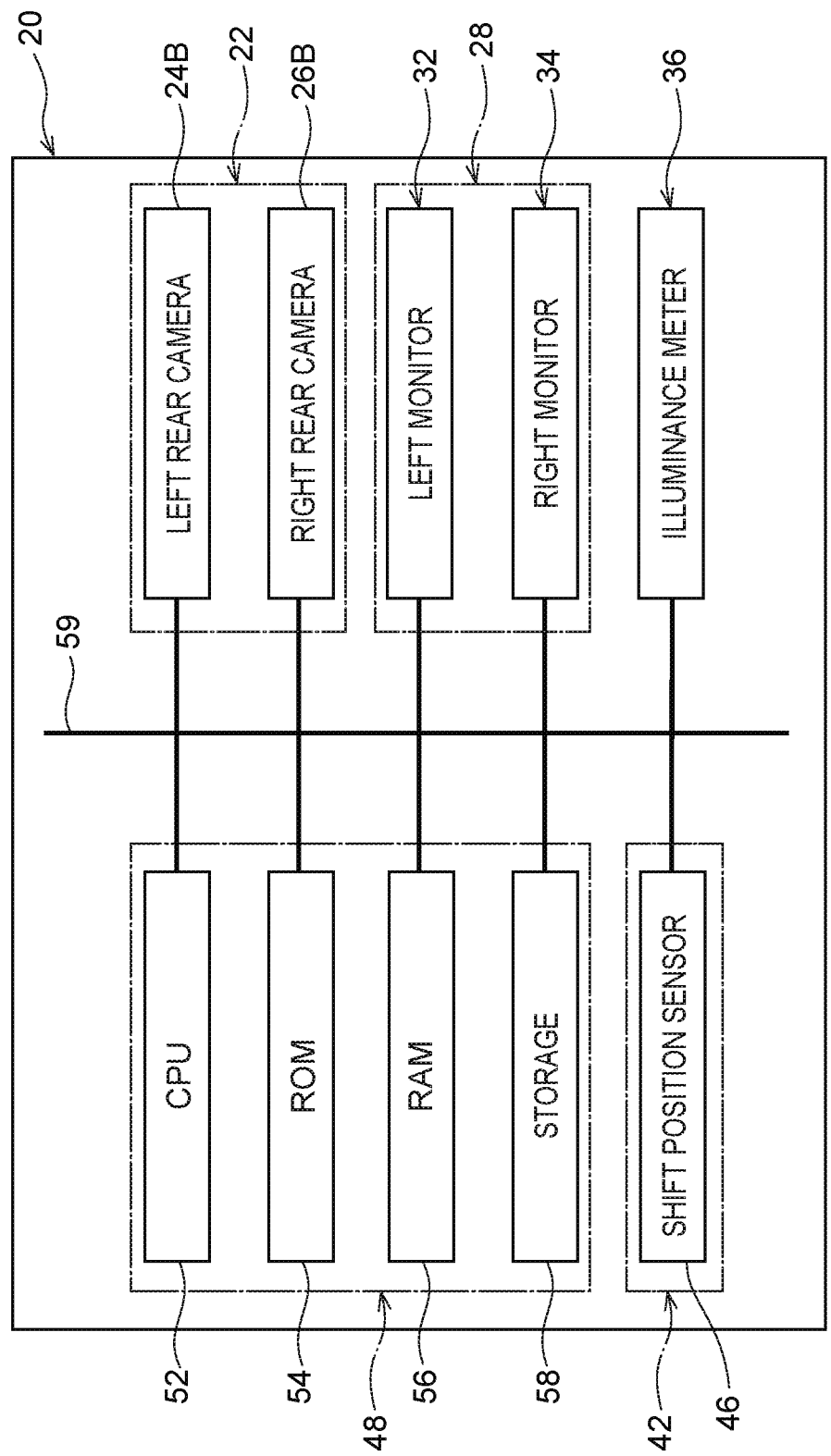
FIG. 2 is a block drawing showing hardware structures of the display system relating to the first embodiment.

The display system 20 shown in FIG. 2 has, as an example, a camera unit 22, a monitor unit 28, an illuminance meter 36, a shift lever unit 42, and a control unit 48. The camera unit 22, the monitor unit 28, the illuminance meter 36, the shift lever unit 42, and the control unit 48 are connected so as to be able to communicate with one another via a bus 59.

<Camera Unit>

The camera unit 22 shown in FIG. 1 has a left camera portion 24 and a right camera portion 26. The camera unit 22 is structured so as to capture images of the rear lateral sides of the vehicle 10.

The left camera portion 24 has a left side support 24A and a left rear camera 24B. The left side support 24A is substantially rectangular parallelepiped, and the distal end portion thereof is curved. The proximal end portion of the left side support 24A is mounted to the vehicle longitudinal direction front end portion of a vehicle vertical direction intermediate portion of the left front side door 25. Namely, the left side support 24A is mounted to the left front side door 25 such that the distal end portion of the left side support 24A projects-out toward the vehicle outer side. Moreover, the left side support 24A can rotate in the vehicle longitudinal direction with the vehicle vertical direction being the axial direction. The left side support 24A can, by the driving force of an unillustrated actuator, rotate to a stored position, at which the length direction of the left side support 24A runs approximately along the outer side surface of the vehicle 10, and an extended position at which the left rear camera 24B captures images of the left rear side of the vehicle 10.

The left rear camera 24B is structured to include an unillustrated lens and an imaging element 29 that serves as an example of a light receiving section (a light receiving portion). The imaging element 29 converts light, which passes-through the lens and is incident, into an electric signal. The electric signal of the imaging element 29 can be amplified. Namely, the imaging element 29 is provided such that the sensitivity (gain=degree of amplification of the signal) can be changed. The sensitivity of the imaging element 29 is changed by the control unit 48 that is described later. Further, the left rear camera 24B is mounted to the distal end portion of the left side support 24A. Concretely, the imaging optical axis (lens optical axis) of the left rear camera 24B faces toward the left rear side of the vehicle 10, and the left rear camera 24B captures images of the left rear side of the vehicle 10.

Figure 5A:
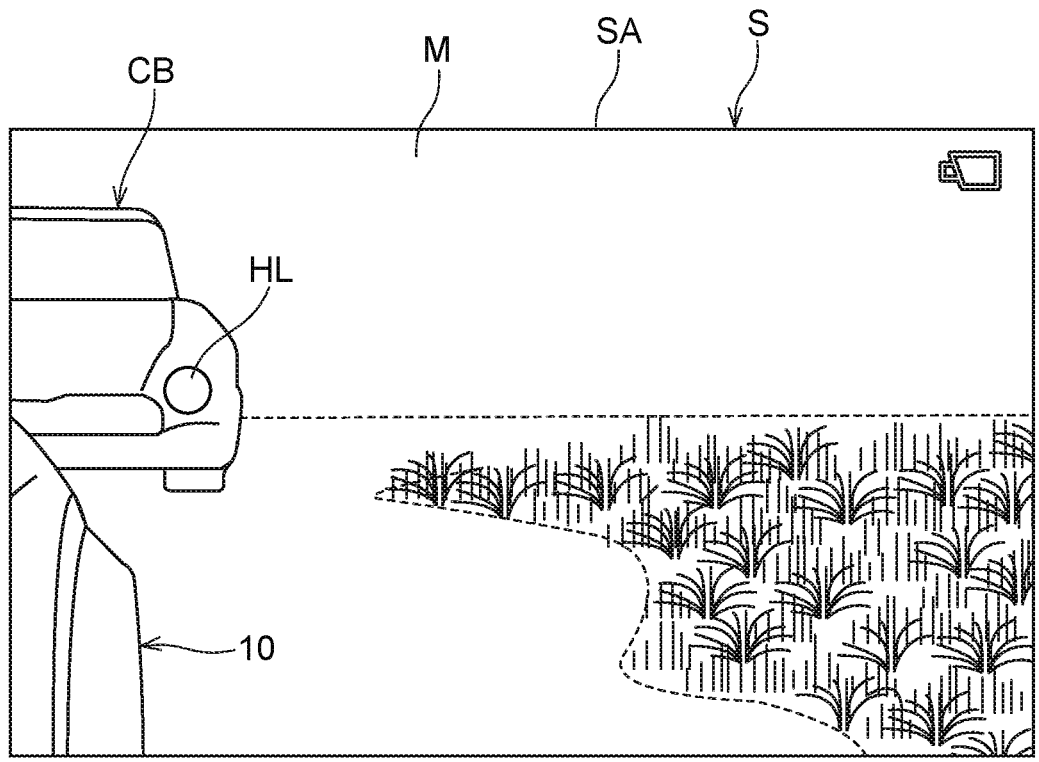
FIG. 5A is a schematic drawing showing an example of an image that is displayed on a monitor unit at a usual image angle in a case in which the vehicle is advancing forward during the daytime in the display system relating to the first embodiment.
Figure 5B:
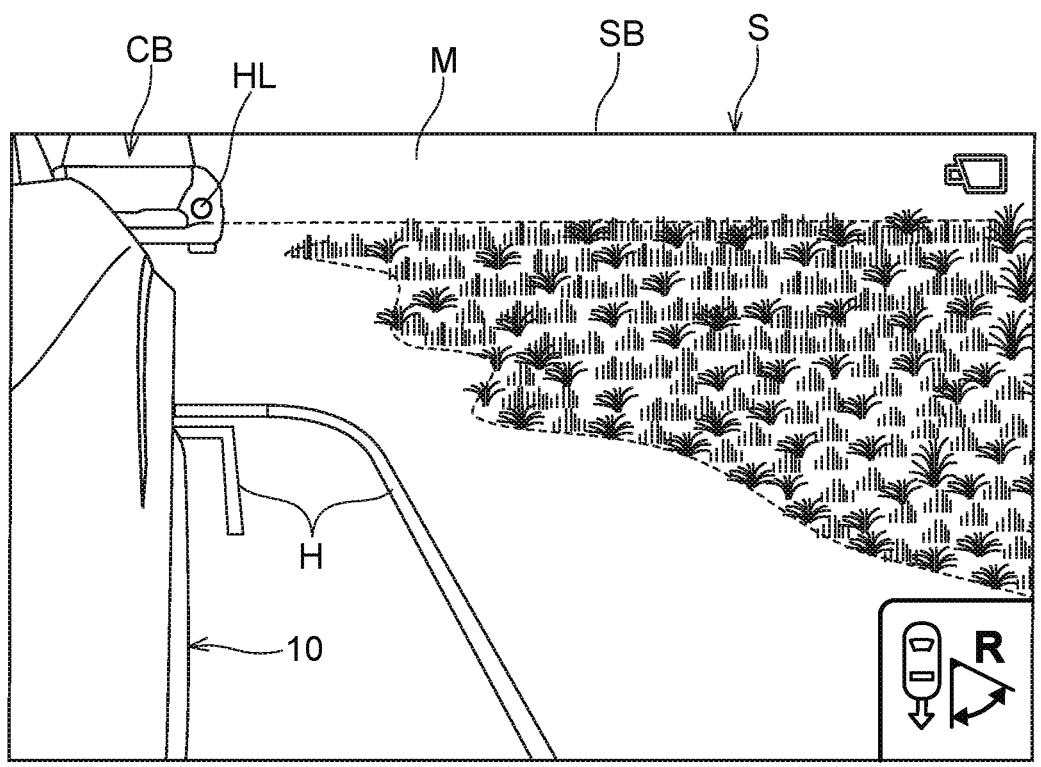
FIG. 5B is a schematic drawing showing an example of an image that is displayed on the monitor unit at a wide image angle in a case in which the vehicle is traveling rearward during the daytime in the display system relating to the first embodiment.

Moreover, the left rear camera 24B is provided at the vehicle 10 such that an imaging range S (see FIG. 5A) of the left rear side of the vehicle 10 can be switched between a usual first imaging range SA (refer to FIG. 5A) and a second imaging range SB (refer to FIG. 5B) that is wider than (has a wider angle than) the first imaging range SA. As an example, the switching between the first imaging range SA and the second imaging range SB can be carried out by zooming-in and zooming-out being carried out by using digital zoom (trimming). Namely, the left rear camera 24B always carries out imaging of the second imaging range SB, and, when the imaging range S is switched to the first imaging range SA, the left rear camera 24B cuts-out a portion of the second imaging range SB and enlarges the cut-out portion. Note that, in FIG. 5A, the roof portion of vehicle CB, which is at the rear of the vehicle 10, is included in order to illustrate the vehicle CB in an easy-to-understand manner, but actually, a portion of the second imaging range SB that is shown in FIG. 5B is enlarged.

The right camera portion 26 has a right side support 26A and a right rear camera 26B, and the imaging range S at the right rear side of the vehicle 10 can be switched to the usual first imaging range SA and the wide-angle second imaging range SB. Note that, as an example, the structure of the right camera portion 26 is symmetrical to that of the left camera portion 24 across the vehicle transverse direction center of the vehicle 10. Therefore, illustration and explanation of details of the right camera portion 26 are omitted.

<Monitor Unit>

The monitor unit 28 has a left monitor 32 and a right monitor 34.

As an example, the left monitor 32 is provided at the vehicle cabin 13 inner side in a vicinity of the lower end of the left front pillar garnish 16. The left monitor 32 is a monitor for displaying images of the left rear side that are captured by the left rear camera 24B, and has a display 32A that serves as an example of a display surface. The display 32A is structured by a liquid crystal panel for example. Namely, the left monitor 32 functions in place of the left outer mirror. By viewing the images displayed on the left monitor 32, an unillustrated vehicle occupant (driver) of the vehicle 10 can confirm the situation of the hard-to-view region that is at the left rear side of the vehicle 10.

As an example, the right monitor 34 is provided at the vehicle cabin 13 inner side in a vicinity of the lower end of the right front pillar garnish 18. The right monitor 34 is a monitor for displaying images of the right rear side that are captured by the right rear camera 26B, and has a display 34A that serves as an example of a display surface. The display 34A is structured by a liquid crystal panel for example. Namely, the right monitor 34 functions in place of the right outer mirror. By viewing the images displayed on the right monitor 34, the vehicle occupant of the vehicle 10 can confirm the situation of the hard-to-view region that is at the right rear side of the vehicle 10. In this way, the monitor unit 28 displays, on the displays 32A, 34A, the images that are captured by the camera unit 22.

In the following explanation, the portion, which is a portion within the display 32A, 34A of an image M (see FIG. 7) displayed on the display 32A, 34A and which has a luminous intensity that is lower than a set luminous intensity that is set in advance, is called dark portion D of that image (see FIG. 7).

<Illuminance Meter>

The illuminance meter 36 is mounted to the top surface of the instrument panel 14. The illuminance meter 36 is structured to include an element that converts the light amount of received light into voltage or current. The illuminance meter 36 thereby measures the brightness (illuminance) of the exterior of the vehicle 10. Concretely, the illuminance meter 36 measures the brightness of light that is incident in the vehicle cabin 13 from the exterior of the vehicle 10. Information of the brightness of the light at the exterior of the vehicle 10, which information is obtained by the illuminance meter 36, is sent to the control unit 48.

Note that, in the present embodiment, "illuminance" means the degree of brightness (unit: lux) within the vehicle cabin 13 in a case in which the vehicle cabin 13 interior is illuminated by light from the exterior of the vehicle 10. Further, in the present embodiment, "luminous intensity" means the brightness of a light source, and is expressed as brightness per unit surface area (unit: candelas per square meter).

<Shift Lever Unit>

The shift lever unit 42 is a floor-shifting-type shift lever unit that is provided on the floor between the driver's seat and the front passenger's seat of the vehicle 10. The shift lever unit 42 has unillustrated ranges that are P (park), R (reverse), N (neutral), and D (drive). Concretely, the shift lever unit 42 is structured to include a shift lever 44, a shift position sensor 46, and an unillustrated click member.

The shift lever 44 is provided so as to be able to pivot in the longitudinal direction of the vehicle 10. Due to the shift lever 44 being operated by the driver, the shift position thereof is switched to the P range, the R range, the N range or the D range.

In the following explanation, a state in which, at the vehicle 10, the shift lever 44 has been switched to the D range and an unillustrated accelerator pedal is operated is called the forward advancing state of the vehicle 10. Further, a state in which, at the vehicle 10, the shift lever 44 has been switched to the R range and the unillustrated accelerator pedal is operated is called the rearward traveling state of the vehicle 10. Note that a state in which the shift lever 44 is at the P range or the N range is called the stopped state of the vehicle 10.

The shift position sensor 46 is a sensor for sensing the shift position (range) of the shift lever 44. As an example, the shift position sensor 46 is structured as a so-called contact-type mechanical switch that senses the shift position of the shift lever 44 by contact with a portion of the shift lever 44. A signal, which corresponds to the shift position of the shift lever 44 sensed at the shift position sensor 46, is sent to the control unit 48 that is described hereinafter.

<Control Unit>

The control unit 48 shown in FIG. 2 has a CPU (Central Processing Unit) 52, a ROM (Read Only Memory) 54, a RAM (Random Access Memory) 56, and a storage 58.

The CPU 52 is the central computing processing unit, and executes various types of programs and controls the respective sections of the display system 20. Namely, the CPU 52 reads-out a program from the ROM 54 or the storage 58, and executes the program by using the RAM 56 as a work space. Further, the CPU 52 carries out control of the above-described respective structures, and various types of computing processings, and the like in accordance with programs that are recorded in the ROM 54 and the storage 58.

The ROM 54 stores various types of programs and various types of data. As a work space, the RAM 56 temporarily stores programs and data. The storage 58 is structured by a flash ROM (Read Only Memory), and stores various types of programs including the operating system, and various types of data. In the present embodiment, a display changing program, which switches the above-described imaging range S (see FIG. 5A) in accordance with the forward advancing or rearward traveling of the vehicle 10 and which changes the luminous intensities of the dark portions D of the displays 32A, 34A (see FIG. 1), is stored in the ROM 54 or the storage 58.

Note that, in the present embodiment, "switches the imaging range S in accordance with the forward advancing or rearward traveling of the vehicle 10" has a similar meaning as "switches the imaging range S in accordance with the shift position of the shift lever 44 (see FIG. 1)".

[Functional Structures]

At the time of executing the aforementioned display changing program, the display system 20 realizes various types of functions by using the above-described hardware resources. The functional structures that are realized by the display system 20 are described.

Figure 3:
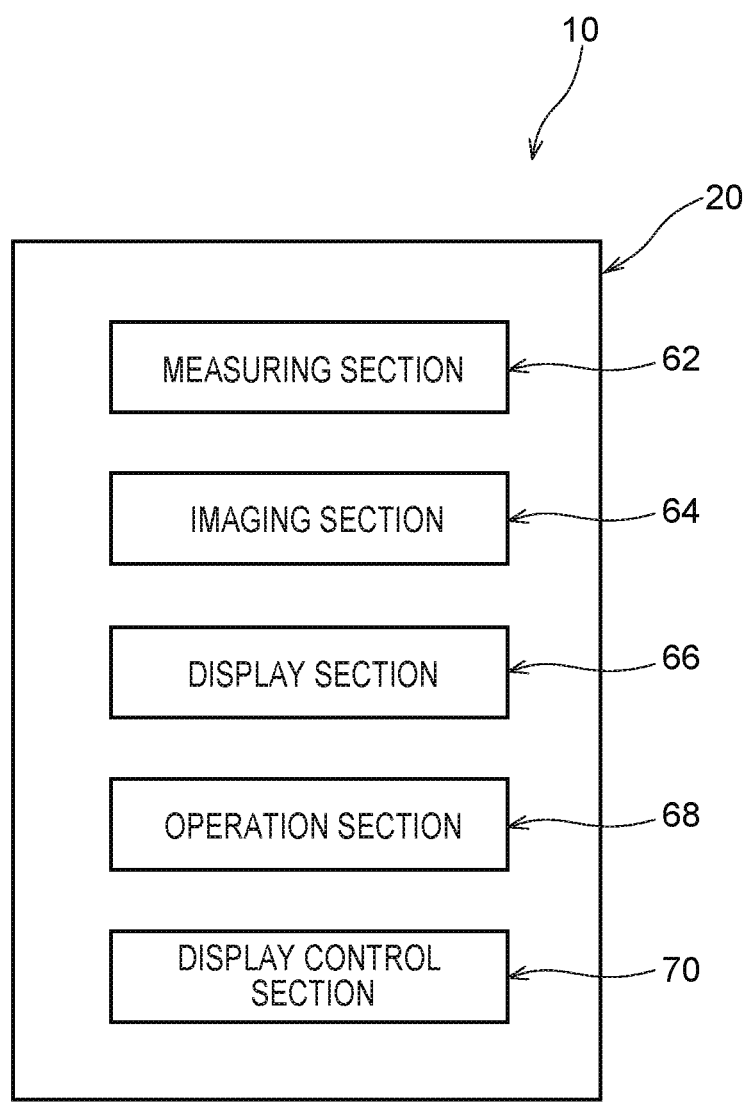
FIG. 3 is a block drawing showing an example of functional structures of the display system relating to the first embodiment.

As shown in FIG. 3, the display system 20 has, as functional structures, a measuring section 62, an imaging section 64, a display section 66, an operation section 68, and a display control section 70. These respective functional structures are realized by the CPU 52 of the control unit 48 reading-out and executing the display changing program that is stored in the ROM 54 or the storage 58 (see FIG. 2).

The measuring section 62 measures the brightness of the exterior of the vehicle 10 by the illuminance meter 36 (see FIG. 2). An information signal of the measured brightness is sent to the display control section 70.

The imaging section 64 captures video images of portions of the vehicle rear side and the vehicle lateral sides (the vehicle rear lateral sides) by the camera unit 22 (see FIG. 2). Due to the camera unit 22 having the left rear camera 24B and the right rear camera 26B (see FIG. 2), the camera unit 22 captures images of portions of the vehicle rear lateral sides at the left and the right of the vehicle 10, respectively. Note that the portions of the vehicle lateral sides that are captured by the left rear camera 24B and the right rear camera 26B mean ranges that are at the vehicle transverse direction outer sides at the vehicle rear side, from the positions where the left rear camera 24B and the right rear camera are provided at the vehicle 10, respectively. Further, the imaging section 64 is provided so as to be able to switch the imaging range S to the first imaging range SA (see FIG. 5A) and the second imaging range SB (see FIG. 5B).

The display section 66 displays the images M (see FIG. 5A) that are captured by the imaging section 64. Concretely, the display section 66 displays the images M, which have been captured by the imaging section 64 and subjected to image processing by the display control section 70 that is described later, by using the left monitor 32 and the right monitor 34 (see FIG. 1).

The operation section 68 is structured such that the operation of one of forward advancing and rearward traveling of the vehicle 10 can be changed by operation of the shift lever 44 (see FIG. 1) by a vehicle occupant. The shift position of the shift lever 44 is sensed by the shift position sensor 46 (see FIG. 1). Then, a shift position information signal of the shift lever 44 sensed by the shift position sensor 46 is sent to the display control section 70. In this way, the vehicle 10 is operated by the operation section 68 so as to one of advance forward or travel rearward.

The display control section 70 receives image information that has been captured by the imaging section 64, and carries out image processing in accordance with the state of the received image information, and outputs the images to the display section 66. Namely, after carrying out image processing in accordance with the state of the image captured by the left rear camera 24B (see FIG. 1), the display control section 70 outputs that image to the left monitor 32 (see FIG. 1). Similarly, after carrying out image processing in accordance with the state of the image captured by the right rear camera 26B (see FIG. 1), the display control section 70 outputs that image to the right monitor 34 (see FIG. 1). In the present embodiment, the addition of assist lines H (see FIG. 7) to the image M is an example of the image processing that corresponds to the state. The assist lines H are displayed together with the image M in a case in which the vehicle 10 is traveling rearward.

Concretely, in a case in which it is nighttime when the brightness measured by the measuring section 62 is less than or equal to a preset set threshold value, and the vehicle 10 is operated to travel rearward by the operation section 68, the display control section 70 carries out control so as to make the imaging range S of the imaging section 64 be the second imaging range SB, and so as to make the luminous intensity of the dark portion D of the image be higher than the luminous intensity of the dark portion D before the rearward traveling of the vehicle 10. In the following explanation, there are cases in which the dark portion D is differentiated by calling the dark portion D before rearward traveling of the vehicle 10 dark portion DA, and calling the dark portion D at the time of rearward traveling of the vehicle 10 dark portion DB. Note that "night" in the present embodiment means, as an example, the time period from sunset to sunrise the following morning, but is not limited to the time period from sunset to sunrise the following morning. It suffices for night to be a time period in which the brightness that is obtained by the illuminance meter 36 (see FIG. 2) is less than or equal to a preset threshold value (hereinafter called set threshold value).

Further, in a case which is at least one of a case in which it is daytime when the brightness (the average value of the incident light amounts) measured by the measuring section 62 is greater than (brighter than) the set threshold value, and a case in which operation other than rearward traveling of the vehicle 10 is being carried out by the operation section 68, the display control section 70 effects control so as to make the imaging range S of the imaging section 64 be the first imaging range SA and so as to maintain the luminous intensity of the image M as is.

In addition, in a case in which the brightness measured by the measuring section 62 is less than or equal to the set threshold value, and rearward traveling of the vehicle 10 is being carried out by the operation section 68, the display control section 70 effects control so as to make the light sensitivity of the imaging element 29 (see FIG. 1) corresponding to the dark portion DB (see FIG. 7) at the imaging section 64 be higher than the light sensitivity of the imaging element 29 that corresponds to the dark portion DA (see FIG. 13) before rearward traveling of the vehicle 10. Note that, in the following explanation, the light sensitivity of the imaging element 29 is called camera gain (unit: dB).

Further, in a case that is at least one of a case in which it is daylight when the brightness measured by the measuring section 62 is greater than the set threshold value, and a case in which operation other than rearward traveling of the vehicle 10 is being carried out by the operation section 68, the display control section 70 effects control so as to make the camera gain corresponding to the dark portion DB at the imaging section 64 be equivalent to the camera gain corresponding to the dark portion DA before rearward traveling of the vehicle 10.

<Camera Gain>

Figure 4A:
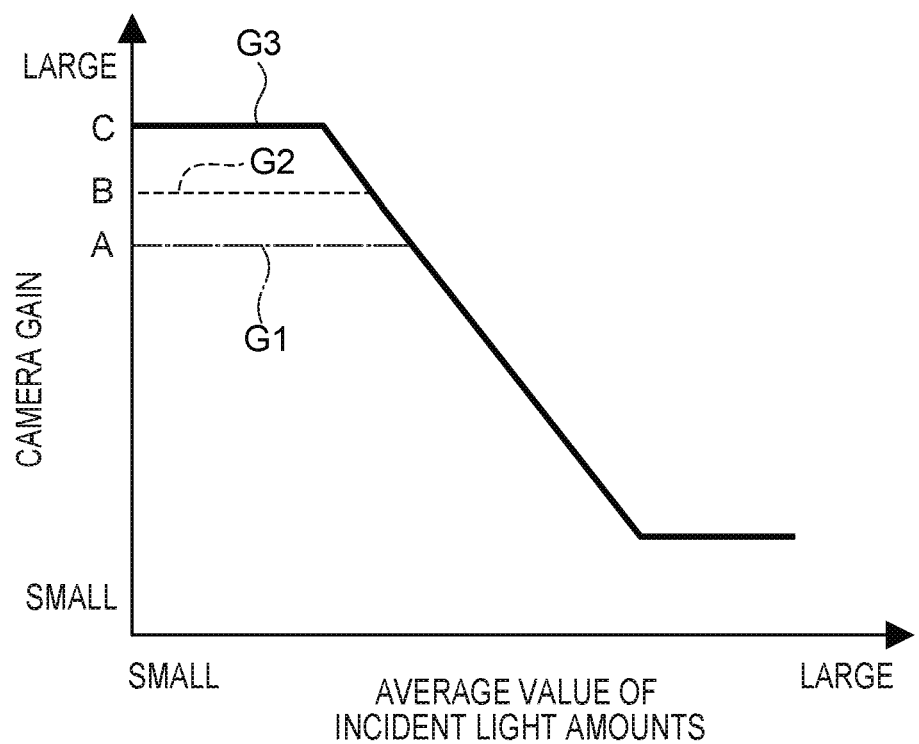
FIG. 4A is a graph showing the relationship between average values of incident light amounts and respective camera gains, in display systems relating to the first embodiment, a second embodiment and a third embodiment.

FIG. 4A illustrates the relationship between the average value of the incident light amounts of the light incident on the imaging element 29 (see FIG. 1), and the camera gain that is set at the camera unit 22 (see FIG. 2), by graph lines G1, G2, G3. Note that the section where the average value of the incident light amounts is smaller than the set value is called the dark section, and the section where the average value of the incident light amounts is greater than that set value is called the bright section. At graph lines G1, G2, G3, the camera gains in the dark section are respectively different. However, the camera gain in the bright section is set to be a substantially similar rate of change, as shown by the solid line. The camera gain decreases as the average value of the incident light amounts increases.

At graph line G1, the maximum value of the camera gain in the dark section is first gain A. At graph line G2, the maximum value of the camera gain in the dark section is second gain B. At graph line G3, the maximum value of the camera gain in the dark section is third gain C. Here, when the magnitudes of the camera gains are compared, first gain A<second gain B<third gain C. Graph line G1 that includes the first gain A, graph line G2 that includes the second gain B, and graph line G3 that includes the third gain C are set by the display control section 70 (see FIG. 2).

During the daytime, the graph line G1 (the first gain A for the dark section) is set by the display control section 70. Further, at nighttime and when the vehicle 10 is advancing forward, the graph G2 line (the second gain B for the dark section) is set by the display control section 70. Moreover, at nighttime and when the vehicle 10 is traveling rearward, the graph line G3 (the third gain C for the dark section) is set by the display control section 70. Note that, in the present embodiment, as an example, the maximum value among the average values of incident light amounts for which the first gain A is set is made to be the set value of the average value of incident light amounts.

<Luminous Intensity Correction>

Figure 4B:
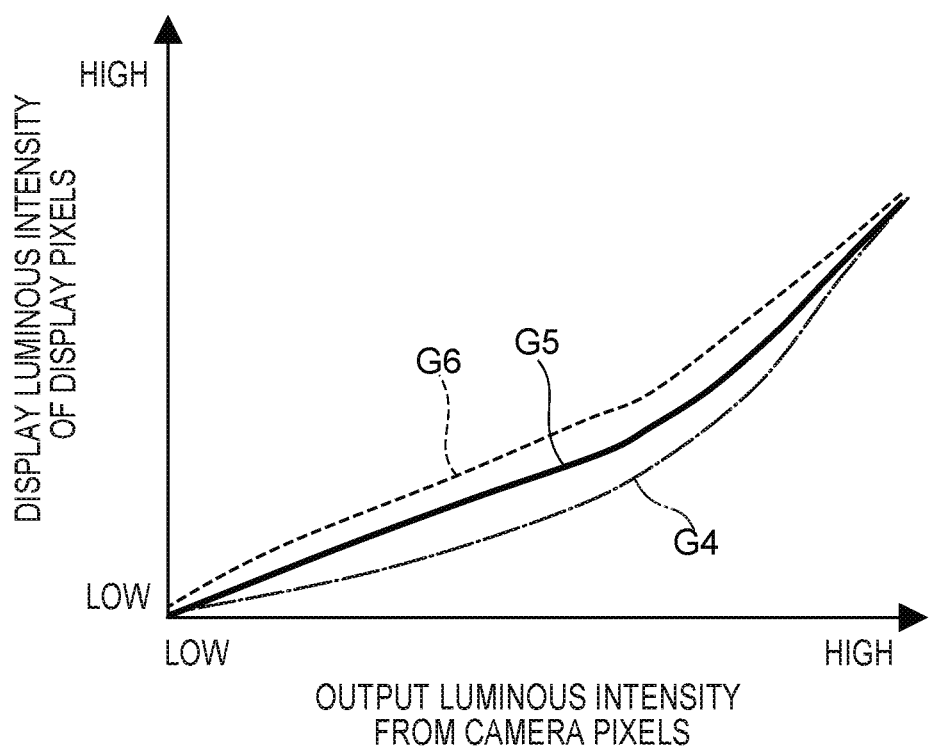
FIG. 4B is a graph showing the relationship between output luminous intensities from camera pixels and display luminous intensities of display pixels in the display systems relating to the first embodiment, the second embodiment and the third embodiment.

FIG. 4B illustrates the relationship between output luminous intensities from the camera pixels (the imaging element 29 (see FIG. 1)), and the display luminous intensities of unillustrated pixels of the displays 32A, 34A (see FIG. 1), by graph lines G4, G5, G6. The respective computational formulas (correction formulas) that correspond to the graph lines G4, G5, G6 are set by the display control section 70 (see FIG. 2). Note that, in the following explanation, graph line G4 is called first γ curve, graph line G5 is called second γ curve, and graph line G6 is called third γ curve.

At all of the first γ curve, the second γ curve and the third γ curve, in the section where the output luminous intensity is low, the rate of change in the display luminous intensity is small, and, in the section where the output luminous intensity is high, the rate of change in the display luminous intensity is large. The section where the output luminous intensity is low is the section corresponding to the above-described dark section. Further, when comparing the display luminous intensities at the respective output luminous intensities in the first γ curve, the second γ curve and the third γ curve, as an example, the first γ curve<the second γ curve<the third γ curve.

During the daytime, the first γ curve is set by the display control section 70. Further, at nighttime and when the vehicle 10 is advancing forward, as an example, the second γ curve is set by the display control section 70. Moreover, at nighttime and when the vehicle 10 is traveling rearward, as an example, the first γ curve is set by the display control section 70. Namely, in the display system 20 of the first embodiment, as an example, only the first γ curve and the second γ curve are used, and the third γ curve is not used. In this way, in the display system 20, the display control section 70 is set so as to carry out mainly changing of the camera gain more so than correcting of the luminous intensity.

COMPARATIVE EXAMPLES

Figure 12:
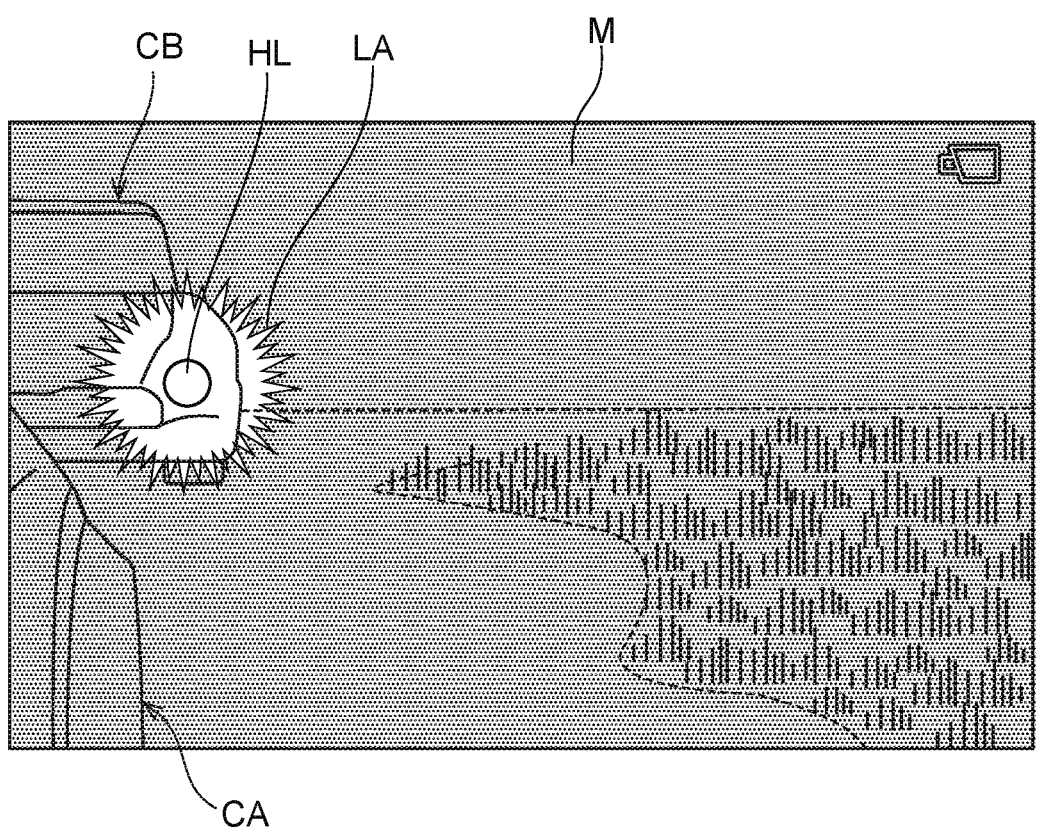
FIG. 12 is a schematic drawing showing an image that is displayed on a monitor unit in a case in which a vehicle is traveling rearward at night in a display system of a first comparative example.

FIG. 12 illustrates a state in which images of the rear of a vehicle CA are captured at nighttime in a display system of a first comparative example (not illustrated). The vehicle CB is stopped at the rear of the vehicle CA. Further, headlights HL of the vehicle CB are on. The usual image angle is used in displaying by the display system of the first comparative example.

In the display system of the first comparative example, at night, in a range in which an object that is a light source does not exist at the rear of the vehicle CA which is the own vehicle, the luminous intensity of the image displayed on an unillustrated monitor is insufficient, and therefore, the visibility of the periphery of the rear portion of the vehicle CA at the time when the vehicle CA is traveling rearward is poor. Further, in the display system of the first comparative example, at night, in a case in which the camera gain is made to be high, the luminous intensity of the image M displayed on the monitor is excessive locally (illustrated lamp light LA). Namely, it is easy for halation to occur, and it is difficult for the vehicle occupant to view the monitor.

Figure 13:
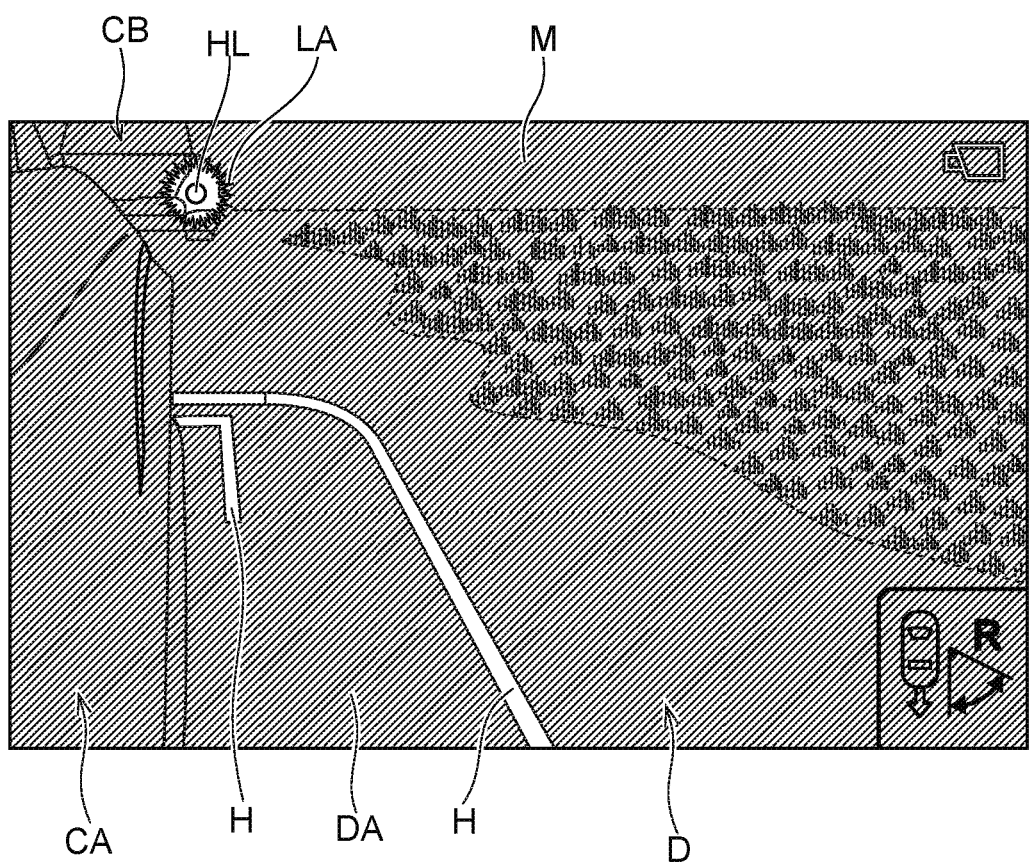
FIG. 13 is a schematic drawing showing an image that is displayed on a monitor unit in a case in which the vehicle is traveling rearward at night in a display system of a second comparative example.

FIG. 13 illustrates a state in which images at the rear of the vehicle CA are captured at nighttime in a display system of a second comparative example (not illustrated). The vehicle CB is stopped at the rear of the vehicle CA. Further, the headlights HL of the vehicle CB are on. An image angle that is wider than usual is used in displaying by the display system of the second comparative example. However, correction of the camera gain is not carried out.

In the display system of the second comparative example, at night, in a range in which an object that is a light source does not exist at the rear of the vehicle CA, the luminous intensity of the image M displayed on the monitor is insufficient, and therefore, the visibility of the periphery of the rear portion of the vehicle CA at the time when the vehicle CA is traveling rearward is poor.

[Operation and Effects]

Operation of the display system 20 of the first embodiment is described next.

Figure 6:
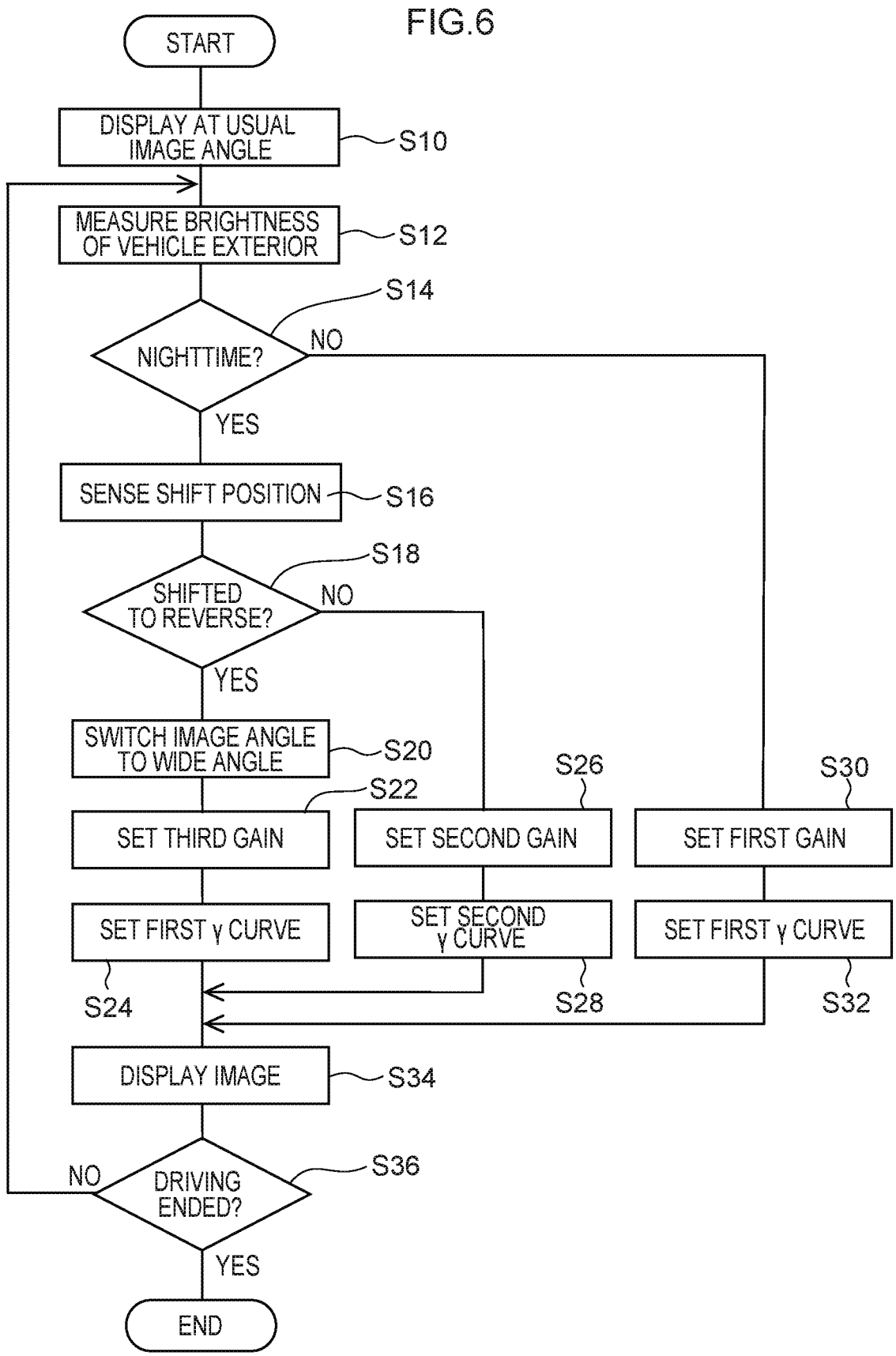
FIG. 6 is a flowchart showing the flow of display changing processing in the display system shown in FIG. 2 and FIG. 3.

FIG. 6 is a flowchart showing the flow of the display changing processing by the display system 20 (see FIG. 2 and FIG. 3). Note that, with regard to the respective sections of the display system 20 and the displayed image M, reference will be made to the respective drawings of FIG. 1 through FIG. 5B, and designation of these individual figure numbers will be omitted. At the display system 20, the display changing processing is carried out due to the CPU 52 reading-out the display changing program from the ROM 54 or the storage 58, and expanding and executing the program in the RAM 56.

In step S10, the CPU 52 causes the monitor unit 28 to display images of the usual image angle (images of the first imaging range SA). Then, the CPU 52 moves on to step S12.

In step S12, measuring of the brightness of the exterior of the vehicle 10 is carried out at the illuminance meter 36. Here, the CPU 52 acquires information of the brightness of the exterior of the vehicle 10 from the illuminance meter 36, and then moves on to step S14.

In step S14, the CPU 52 compares the information (the measured value) of the brightness of the exterior of the vehicle 10 that was acquired from the illuminance meter 36 with the set threshold value. If the measured value is less than or equal to the set threshold value, the CPU 52 judges that it is nighttime and moves on to step S16. If the measured value is greater than the set threshold value, the CPU 52 judges that it is daytime, and moves on to step S30.

In step S16, on the basis of the shift position information sensed by the shift position sensor 46, the CPU 52 senses the shift position of the shift lever 44. Then, the CPU 52 moves on to step S18.

In step S18, the CPU 52 judges whether or not the sensed shift position is the rearward traveling shift position. If the shift position is the rearward traveling shift position (YES), the CPU 52 moves on to step S20. If the shift position is not the rearward traveling shift position (is the forward advancing shift position) (NO), the CPU 52 moves on to step S26.

In step S20, the CPU 52 switches the imaging range S from the first imaging range SA to the second imaging range SB. In other words, the CPU 52 switches the image angle of the image M to a wide angle. Then, the CPU 52 moves on to step S22.

In step S22, the CPU 52 sets graph line G3 (see FIG. 4A) for the camera gain. Concretely, the third gain C is set for the dark portion D of the image M. A gain that is smaller than the third gain C is set for the bright portions that are other than the dark portion D. Then, the CPU 52 moves on to step S24.

In step S24, the CPU 52 sets the first γ curve as the setting of the luminous intensity correction. Then, the CPU 52 moves on to step S34.

In step S26, the CPU 52 sets graph line G2 (see FIG. 4A) for the camera gain. Concretely, the CPU 52 sets the second gain B for the dark portion D of the image M. A gain that is smaller than the second gain B is set for the bright portions that are other than the dark portion D. Then, the CPU 52 moves on to step S28.

In step S28, the CPU 52 sets the second γ curve as the setting of the luminous intensity correction. Then, the CPU 52 moves on to step S34.

In step S30, the CPU 52 sets graph line G1 (see FIG. 4A) for the camera gain. Concretely, the CPU 52 sets the first gain A for the dark portion D of the image M. A gain that is smaller than the first gain A is set for the bright portions that are other than the dark portion D. Then, the CPU 52 moves on to step S32.

In step S32, the CPU 52 sets the first γ curve as the setting of the luminous intensity correction. Then, the CPU 52 moves on to step S34.

In step S34, the CPU 52 causes the monitor unit 28 to display the images M that have been changed (adjusted) on the basis of the camera gain and the γ curve that were set in the prior steps. Then, the CPU 52 moves on to step S36.

In step S36, on the basis of whether or not an unillustrated engine is operating, the CPU 52 judges whether or not driving of the vehicle has ended. If driving of the vehicle has ended (YES), the CPU 52 ends the program. If driving of the vehicle continues (NO), the CPU 52 moves on to step S12.

In a case in which it is daytime, the image M, which is the usual image angle and has been changed (adjusted) on the basis of graph line G1 and the first γ curve, is displayed by the monitor unit 28. Because it is brighter during the day than at night, good visibility of the periphery of the rear portion of the vehicle 10 (the own vehicle) is obtained regardless of whether the vehicle is advancing forward or traveling rearward.

In a case in which it is nighttime and the vehicle 10 is advancing forward, the image M, which is the usual image angle and has been changed on the basis of graph line G2 and the second γ curve, is displayed by the monitor unit 28. Good visibility of the rear of the vehicle 10 is obtained from this image M even at night, due to the fact that the camera gain is larger than during the day and the fact that the luminous intensity of the dark portion is increased on the basis of the second γ curve.

Figure 7:
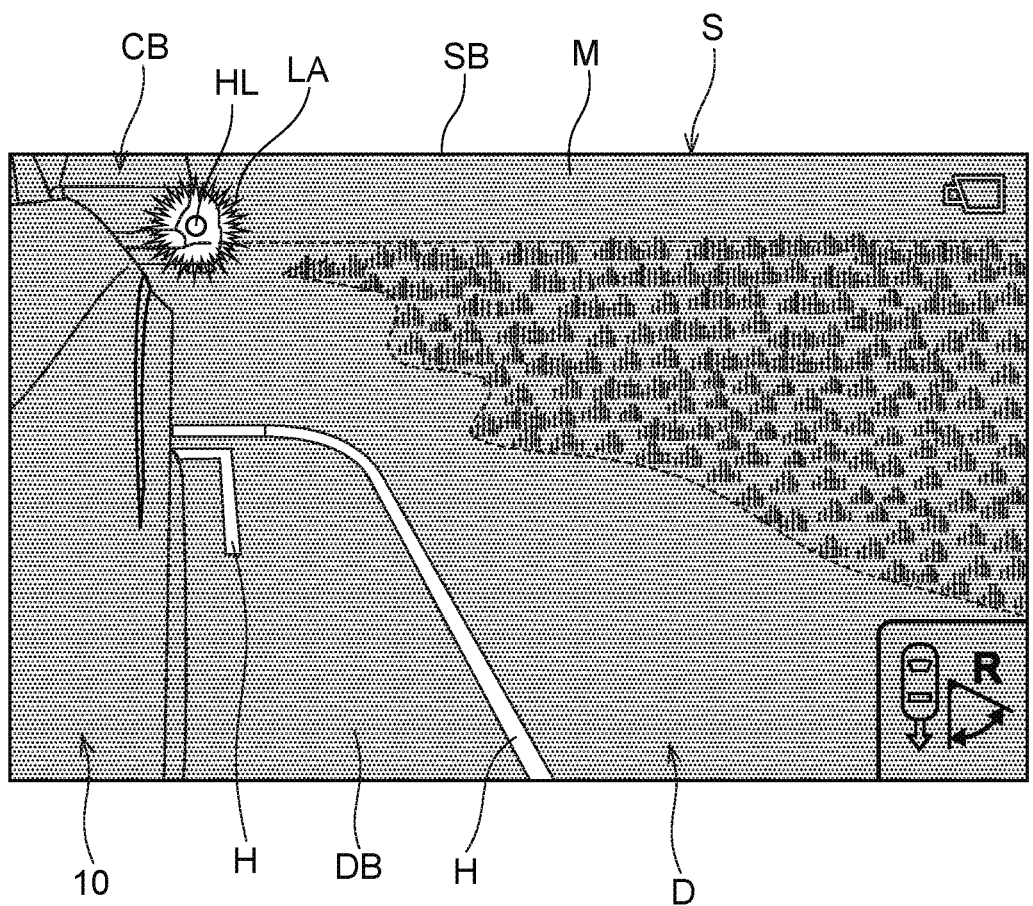
FIG. 7 is a schematic drawing showing an example of an image that is displayed on the monitor unit in a case in which the vehicle is traveling rearward at night in the display system shown in FIG. 2 and FIG. 3.

As shown in FIG. 7, in a case in which it is nighttime and the vehicle 10 is traveling rearward, the image M, which is wide angle and has been changed on the basis of graph line G3 and the first γ curve, is displayed by the monitor unit 28 (see FIG. 2). Because the third gain B is larger than the first gain A and the second gain B, the dark portion DB of the image M can be viewed similarly to the bright portions (the regions other than the dark portion DB).

As described above, at the measuring section 62 of the display system 20, the brightness of the exterior of the vehicle 10 is measured. At the operation section 68, the vehicle 10 is operated so as to one of advance forward or travel rearward. At the imaging section 64, images of the rear lateral sides of the vehicle 10 are captured. At the display control section 70, the imaging range S of the imaging section 64 is made to be the second imaging range SB in a case in which it is nighttime when the brightness measured by the measuring section 62 is less than or equal to the set threshold value and the vehicle 10 is operated by the operation section 68 so as to travel rearward. Moreover, at the display control section 70, the luminous intensity of the dark portion DB, which is a portion within the display 32A, 34A of the image M displayed within the display surface (the display 32A, 34A) of the display section 66 and which has a luminous intensity that is lower than the set luminous intensity, is made to be higher than the luminous intensity of the dark portion DA (see FIG. 13) before the rearward traveling of the vehicle 10.

Here, due to the imaging range S of the imaging section 64 being switched from the first imaging range SA to the second imaging range SB that is wide, within the display surface of the image M, the proportion of the surface area of the portion having high luminous intensity, with respect to the entire surface area, is small as compared with that proportion before the imaging range S is switched. Due thereto, the luminous intensity of the image M displayed by the display section 66 becoming excessive locally is suppressed, and therefore, the image M of the display section 66 is easy to view. Moreover, by making the luminous intensity of the dark portion DB of the image M be higher than the luminous intensity of the dark portion DA before rearward traveling of the vehicle 10, the state of the dark portion DB is easily recognized by the vehicle occupant (the driver). In this way, in the display system 20, because the image M of the display section 66 is easy to view and the state of the dark portion DB is easy to recognize, the visibility of the periphery of the rear portion of the vehicle 10 when the vehicle 10 (the own vehicle) is traveling rearward at night can be improved.

Further, at the display control section 70 of the display system 20, in a case in which the brightness that is measured by the measuring section 62 is less than or equal to the set threshold value and the vehicle 10 is operated so as to travel rearward by the operation section 68, the light sensitivity (the third gain C) of the portion, which corresponds to the dark portion D, at the light receiving portion (the light receiving element 29) is made to be higher than the light sensitivity (the second gain B) before rearward traveling of the vehicle 10. Here, the imaging element 29 is disposed at the most upstream side of the path of transmitting image information from the imaging section 64 to the display section 66. Namely, by making high the sensitivity of light at the imaging element 29 that is disposed furthest upstream in the path of transmission of image information, the resolution of the image information that is transmitted downstream is high, and therefore, the visibility of the dark portion D at the display section 66 can be improved.

Second Embodiment

A display system 80, which serves as an example of an electronic mirror system relating to a second embodiment, is described next. The display system 80 is provided at the vehicle 10 in place of the display system 20 (see FIG. 1). Note that structures that are basically the same as those of the display system 20 are denoted by the same reference numerals as in the display system 20, and description thereof is omitted.

Figure 8:
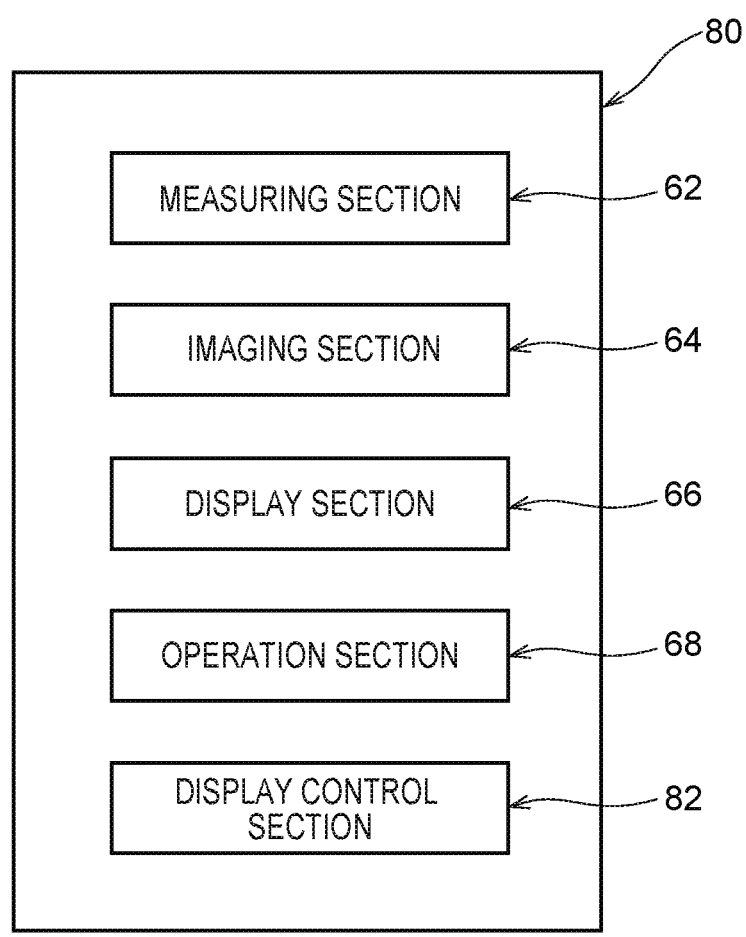
FIG. 8 is a block drawing showing an example of functional structures of a display system relating to a second embodiment.

The display system 80 shown in FIG. 8 has, as the functional structures thereof, the measuring section 62, the imaging section 64, the display section 66, the operation section 68, and a display control section 82. These respective functional structures are realized by the CPU 52 (see FIG. 2) of the control unit 48 reading-out and executing a display changing program that is stored in the ROM 54 or the storage 58 (see FIG. 2). Note that the display system 80 has the camera unit 22, the monitor unit 28, the illuminance meter 36, the shift lever unit 42 and the control unit 48 (refer to FIG. 2 for all of these). The hardware structures of the display system 80 are similar to the hardware structures of the display system 20 (see FIG. 2).

The display control system 82 receives image information that has been captured by the imaging section 64, and carries out image processing in accordance with the state of the received image information, and outputs the image to the display section 66. Namely, after carrying out image processing in accordance with the state of the image captured by the left rear camera 24B (see FIG. 2), the display control section 82 outputs that image to the left monitor 32 (see FIG. 2). Similarly, after carrying out image processing in accordance with the state of the image captured by the right rear camera 26B (see FIG. 2), the display control section 82 outputs that image to the right monitor 34 (see FIG. 2).

Further, in a case in which the brightness measured by the measuring section 62 is less than or equal to a set threshold value (nighttime), and the vehicle 10 is operated to travel rearward by the operation section 68, the display control section 82 corrects information of a first luminous intensity of the dark portion DA before rearward traveling of the vehicle 10 to information of a second luminous intensity of the dark portion DB, such that the second luminous intensity becomes higher than the first luminous intensity. Thereafter, the display control section 82 outputs the corrected information to the display section 66.

Concretely, at the display control section 82, during the daytime, graph line G1 (refer to FIG. 4A: for the dark portion, the first gain A) is set as the camera gain, and the first γ curve is set as the luminous intensity correction. Further, at the display control section 82, in the case of forward advancing of the vehicle 10 at night, graph line G2 (refer to FIG. 4A: for the dark portion, the second gain B) is set as the camera gain, and the second γ curve is set as the luminous intensity correction. Moreover, at the display control section 82, in the case of rearward traveling of the vehicle 10 at night, graph line G2 (for the dark portion, the second gain B) is set as the camera gain, and the third γ curve is set as the luminous intensity correction. Namely, in the display system 80 of the second embodiment, the display control section 82 is set so as to carry out mainly correction of the luminous intensity more so than changing of the camera gain.

[Operation and Effects]

Operation and effects of the display system 80 of the second embodiment are described next. Note that, with regard to the respective sections of the display system 80, reference will be made to FIG. 1, FIG. 2 and FIG. 8, and designation of these individual figure numbers will be omitted.

Figure 9:
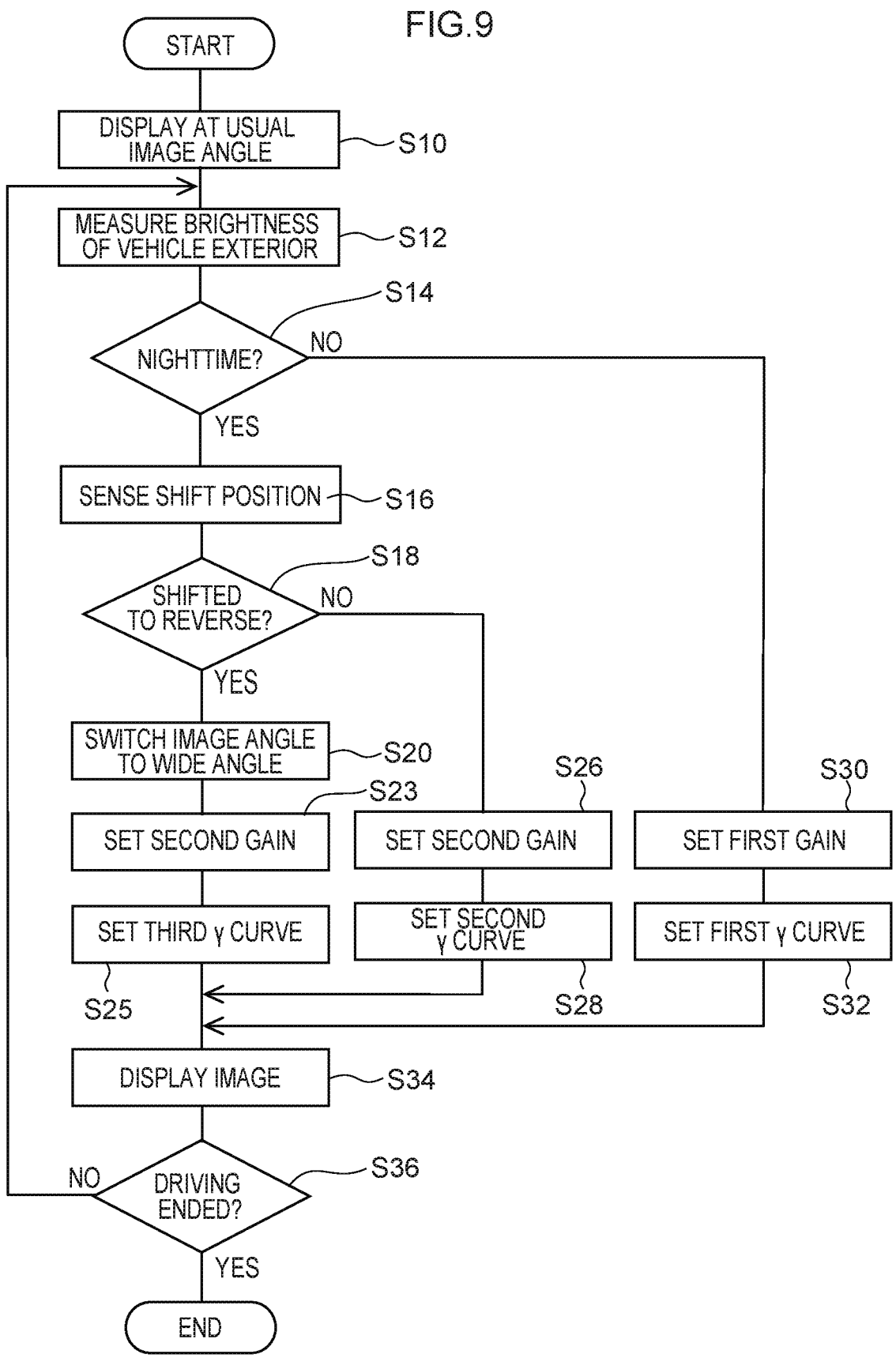
FIG. 9 is a flowchart showing the flow of display changing processing in the display system shown in FIG. 8.

FIG. 9 is a flowchart showing the flow of the display changing processing by the display system 80. At the display system 80, the display changing processing is carried out due to the CPU 52 reading-out the display changing program from the ROM 54 or the storage 58, and expanding and executing the program in the RAM 56. Note that, in the display changing processing by the display system 80, only the contents of processing of some of the steps differ from those of the display changing processing by the display system 20 (see FIG. 2). Therefore, only the steps whose contents of processing differ from the display system 20 are mainly described, and the description of steps having the same contents of processing is omitted.

In step S20, the CPU 52 switches the imaging range S from the first imaging range SA to the second imaging range SB. Then, the CPU 52 moves on to step S23.

In step S23, the CPU 52 sets the graph line G2 (see FIG. 4A) for the camera gain. Concretely, the CPU 52 sets the second gain B for the dark portion D of the image M. A gain that is smaller than the second gain B is set for the bright portions that are other than the dark portion D. Then, the CPU 52 moves on to step S25.

In step S25, the CPU 52 sets the third γ curve as the setting of the luminous intensity correction. Then, the CPU 52 moves on to step S34.

In step S34, the CPU 52 causes the monitor unit 28 to display the images that have been changed (adjusted) on the basis of the set camera gain and γ curve. Then, the CPU 52 moves on to step S36.

As described above, in the display system 80, by switching the imaging range S of the imaging section 64 from the first imaging range SA to the second imaging range SB that is wide, within the display surface of the image M, the proportion of the surface area of the portion having high luminous intensity, with respect to the entire surface area, is small as compared with that proportion before the imaging range S is switched. Due thereto, the luminous intensity of the image M displayed by the display section 66 becoming excessive locally is suppressed, and therefore, the image M of the display section 66 is easy to view. Moreover, by making the luminous intensity of the dark portion DB of the image M be higher than the luminous intensity of the dark portion DA before rearward traveling of the vehicle 10, the state of the dark portion D is easy to recognize. In this way, in the display system 80, because the image M of the display section 66 is easy to view and the state of the dark portion DB is easy to recognize, the visibility of the periphery of the rear portion of the vehicle 10 when the vehicle 10 is traveling rearward at night can be improved.

Further, in the display system 80, in a case in which it is night and the vehicle 10 is operated so as to travel rearward by the operation section 68, the display control section 82 corrects the information of the first luminous intensity of the dark portion DA before rearward traveling of the vehicle 10 to the information of the second luminous intensity of the dark portion DB by using the third γ curve, such that the second luminous intensity becomes higher than the first luminous intensity. Here, the setting of the correction from the information of the first luminous intensity to the information of the second luminous intensity is carried out at the display control section 82 that is different than the imaging section 64, and it is difficult for this setting of the correction to be affected by the structure of the imaging section 64. Therefore, the setting of the correction of the luminous intensity can be carried out freely at the display control section 82.

Third Embodiment

A display system 90, which serves as an example of an electronic mirror system relating to a third embodiment, is described next. The display system 90 is provided at the vehicle 10 in place of the display system 20 (see FIG. 1). Note that structures that are basically the same as those of the display systems 20, 80 are denoted by the same reference numerals as in the display systems 20, 80, and description thereof is omitted.

Figure 10:
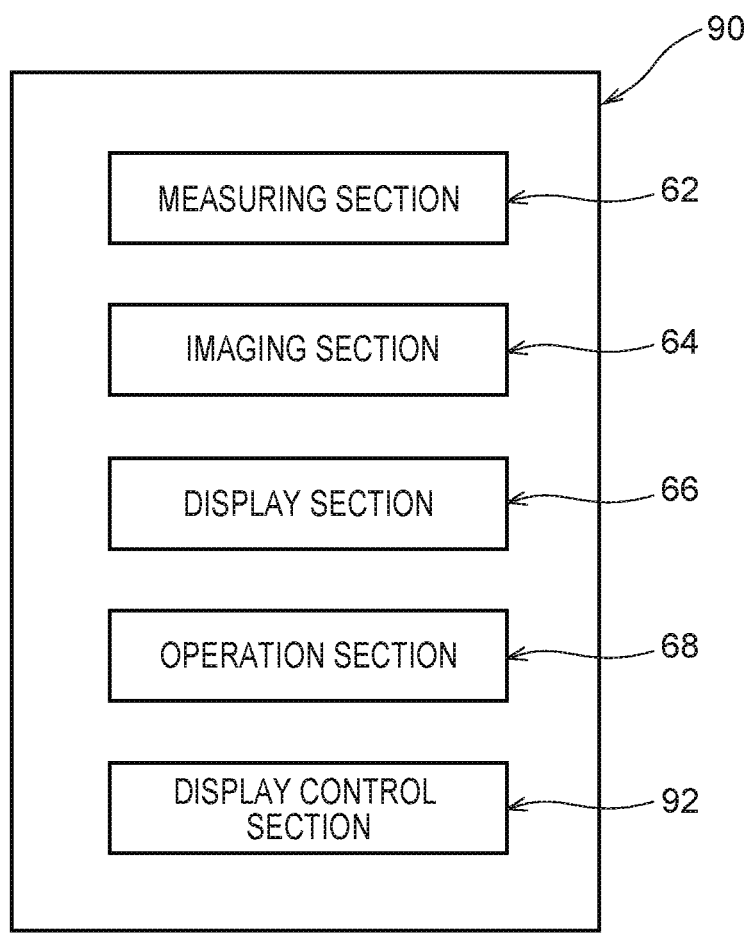
FIG. 10 is a block drawing showing an example of functional structures of a display system relating to a third embodiment.

The display system 90 shown in FIG. 10 has, as the functional structures thereof, the measuring section 62, the imaging section 64, the display section 66, the operation section 68, and a display control section 92. These respective functional structures are realized by the CPU 52 (see FIG. 2) of the control unit 48 reading-out and executing a display changing program that is stored in the ROM 54 or the storage 58 (see FIG. 2). Note that the display system 90 has the camera unit 22, the monitor unit 28, the illuminance meter 36, the shift lever unit 42 and the control unit 48 (refer to FIG. 2 for all of these). The hardware structures of the display system 90 are similar to the hardware structures of the display system 20 (see FIG. 2) and the display system 80 (see FIG. 6).

The display control system 92 receives image information that has been captured by the imaging section 64, and carries out image processing in accordance with the state of the received image information, and outputs the image to the display section 66. Further, at the display control section 92, in a case in which it is nighttime and the vehicle 10 is traveling rearward, the graph line G3 (see FIG. 4A) is set. Concretely, the third gain C is set for the dark portion D of the image M. A gain that is smaller than the third gain C is set for the bright portions that are other than the dark portion D. Moreover, in a case in which it is nighttime and the vehicle 10 is operated to travel rearward by the operation section 68, the display control section 92 corrects the information of the first luminous intensity of the dark portion DA to information of the second luminous intensity of the dark portion DB by using the third γ curve such that the second luminous intensity becomes higher than the first luminous intensity, and outputs the corrected information to the display section 66.

Concretely, at the display control section 92, during the daytime, the graph line G1 (see FIG. 4A) is set as the camera gain, and the first γ curve is set as the luminous intensity correction. Further, at the display control section 92, in a case of forward advancing of the vehicle 10 during the night, the graph line G2 (see FIG. 4A) is set as the camera gain, and the second γ curve is set as the luminous intensity correction. Moreover, at the display control section 92, in a case of rearward traveling of the vehicle 10 during the night, the graph line G3 (see FIG. 4A) is set as the camera gain, and the third γ curve is set as the luminous intensity correction. Namely, the display system 90 of the third embodiment is set such that the display control section 92 carries out both changing of the camera gain and correction of the luminous intensity.

[Operation and Effects]

Operation and effects of the display system 90 of the third embodiment are described next. Note that, with regard to the respective sections of the display system 90, reference will be made to FIG. 1, FIG. 2 and FIG. 10, and designation of these individual figure numbers will be omitted.

Figure 11:
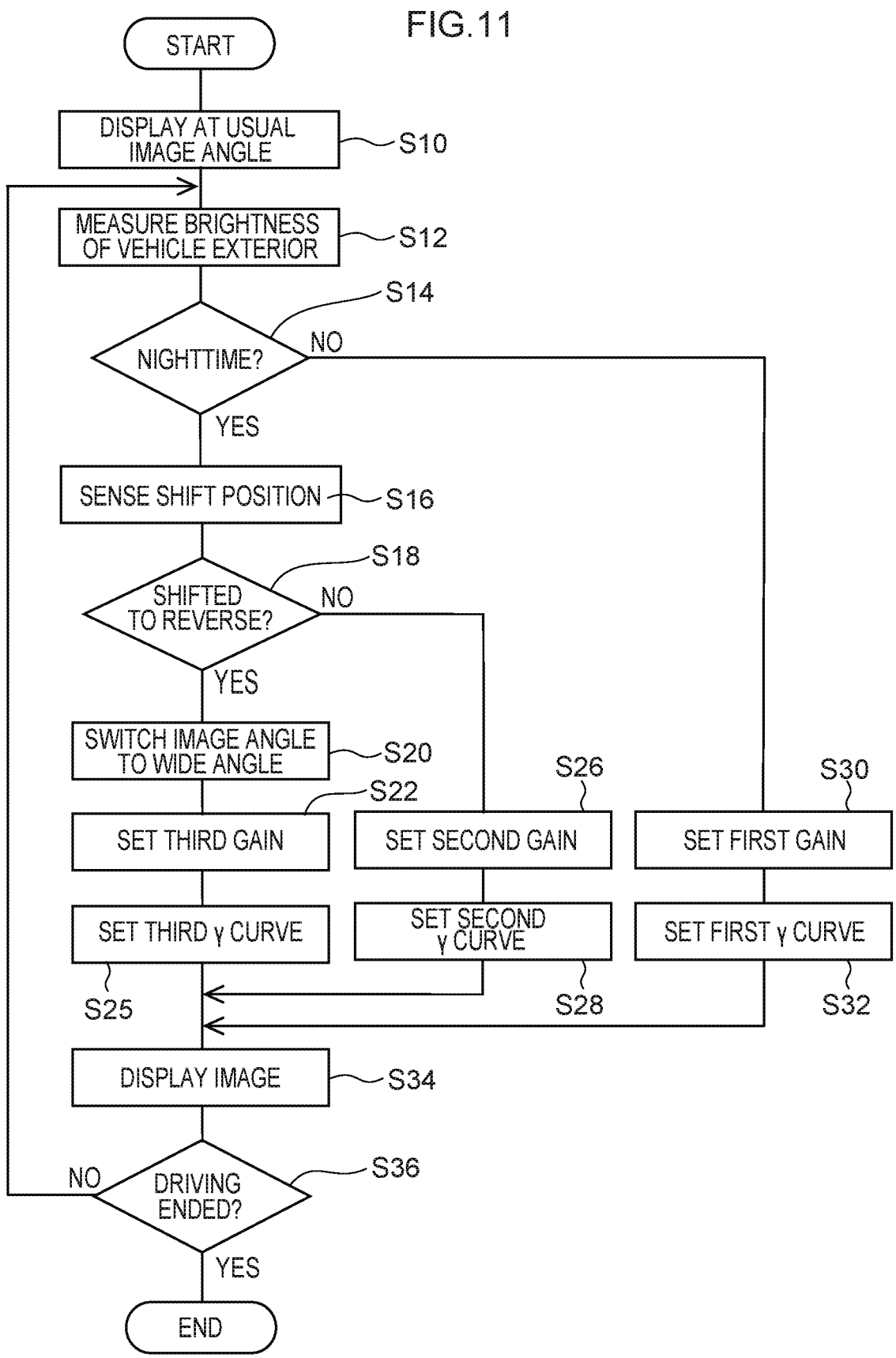
FIG. 11 is a flowchart showing the flow of display changing processing in the display system shown in FIG. 10.

FIG. 11 is a flowchart showing the flow of the display changing processing by the display system 90. At the display system 90, the display changing processing is carried out due to the CPU 52 reading-out a display changing program from the ROM 54 or the storage 58, and expanding and executing the program in the RAM 56. Note that, in the display changing processing by the display system 90, only the contents of processing of some of the steps differ from the display changing processing by the display system 20 (see FIG. 2). Therefore, only the steps whose contents of processing differ from the display system 20 are mainly described, and the description of steps having the same contents of processing is omitted.

In step S20, the CPU 52 switches the imaging range S from the first imaging range SA to the second imaging range SB. Then, the CPU 52 moves on to step S22.

In step S22, the CPU 52 sets graph line G3 (the third gain C at the dark portion) for the camera gain. Then, the CPU 52 moves on to step S25.

In step S25, the CPU 52 sets the third γ curve as the setting of the luminous intensity correction. Then, the CPU 52 moves on to step S34.

In step S34, the CPU 52 causes the monitor unit 28 to display the images that have been changed (adjusted) on the basis of the set camera gain and γ curve. Then, the CPU 52 moves on to step S36.

As described above, in the display system 90, by switching the imaging range S of the imaging section 64 from the first imaging range SA to the second imaging range SB that is wide, within the display surface of the image M, the proportion of the surface area of the portion having high luminous intensity, with respect to the entire surface area, is small as compared with that proportion before the imaging range S is switched. Due thereto, the luminous intensity of the image M displayed by the display section 66 becoming excessive locally is suppressed, and therefore, the image M of the display section 66 is easy to view. Moreover, by making the luminous intensity of the dark portion DB of the image M be higher than the luminous intensity of the dark portion DA before rearward traveling of the vehicle 10, the state of the dark portion DB is easy to recognize. In this way, in the display system 90, because the image M of the display section 66 is easy to view and the state of the dark portion DB is easy to recognize, the visibility of the periphery of the rear portion of the vehicle 10 when the vehicle 10 is traveling rearward at night can be improved.

Further, in the display system 90, the display control section 92 is set so as to carry out both changing of the camera gain (setting of the graph line G3) and correction of the luminous intensity (setting of the third γ curve). Therefore, at the display system 90, the visibility of the dark portion D at the display section 66 can be improved, and the setting of the correction of the luminous intensity can be carried out freely at the display control section 92.

The present disclosure is not limited to the above-described embodiments.

Although the camera unit 22 is structured from the left rear camera 24B and the right rear camera 26B, the present disclosure is not limited to this, and the camera unit may be structured by three or more cameras or radar devices or the like.

Although the monitor unit 28 is structured from the left monitor 32 and the right monitor 34, the present disclosure is not limited to this, and the monitor unit may be structured by three or more monitors.

A switch for a daytime mode and a nighttime mode may be provided at the instrument panel 14, and a vehicle occupant may manually carry out switching between daytime and nighttime. For example, in a case in which the judgment as to whether or not it is nighttime is not carried out correctly due to problems with operation of the illuminance meter 36 or the like, the nighttime mode may be set by the vehicle occupant pushing the switch for the nighttime mode.

The shift position sensor 46 is not limited to being structured by a contact-type mechanical switch, and may be, for example, a sensor that detects a magnetic field or an optical sensor that detects the absence/presence of blocking of light. Further, with regard to the shift positions (ranges) of the shift lever 44, shifting to other than the R range may all be considered to be shifting for forward advancing. Namely, not only shifting that shifts in the order of the D range, the R range and the D range, but also cases of shifting in the order of the D range, the R range and the N range, and cases of shifting in the order of the N range, the R range and the P range, also are included among objects of control of the present embodiments.

The lateral magnification and the vertical magnification of the wide angle image of the second imaging range SB may be adjusted such that the aspect ratio thereof becomes equivalent to that of an image of the usual image angle.

With regard to the first gain A and the second gain B, the second gain B may be made to be smaller than the first gain A.

Methods of making the image brighter by signal processor processing of, for example, the camera, the ECU (Electronic Control Unit) or the display can be contemplated as methods other than changing the camera gain and changing the γ curve. For example, in the case of a camera that realizes an HDR (High Dynamic Range) due to the provision of plural exposure elements (imaging elements) that have different sensitivities and the combining (inclusion) of the image signals from these plural exposure elements, the image can be made to be brighter by providing a greater number of exposure elements that have high sensitivity.

Note that any of various types of processors other than the CPU 52 may execute the display changing processing that the CPU 52 executes by reading out software (programs) in the above-described respective embodiments. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the display changing processing may be executed by one of these various types of processors, or may be executed by combining two or more of the same type or different types of processors (e.g., plural FPGAs, or a combination of a CPU and an FPGA, or the like). The hardware structures of these various types of processors are, more concretely, electrical circuits that combine circuit elements such as semiconductor elements and the like.

Further, although the above-described respective embodiments describe forms in which the display changing program is stored in advance (is installed in) the ROM 54 or the storage 58, the present disclosure is not limited to this. The program may be provided in a form of being recorded on a recording medium such as a CD-ROM (Compact Disk Read Only Memory), a DVD-ROM (Digital Versatile Disk Read Only Memory), a USB (Universal Serial Bus) memory, or the like. Further, the program may be in a form such that it is downloaded from an external device via a network.

"Makes luminous intensity of a dark portion, which is a portion within a display surface of an image displayed on that display surface and whose luminous intensity is lower than a set luminous intensity, be higher than luminous intensity of the dark portion before the vehicle travels rearward" includes not only making only the luminous intensity of the dark portion (the dark section) high, but also includes making the luminous intensity of the dark portion high and also making the luminous intensity of the bright portion (the bright section) high. Concretely, the graph lines G1, G2, G3 of the respective camera gains may be set so as to become larger in the order of the graph lines G1, G2, G3 for the camera gain of the bright portion as well. Namely, it is possible to make only the luminous intensity of the dark portion high, or it is also possible to make the luminous intensity of the entire image, including the bright portion as well, high.

What is claimed is:

1. An electronic mirror system comprising:
a measuring section that measures a brightness of a vehicle exterior;
an imaging section that is configured to switch an imaging range thereof, between a first imaging range and a second imaging range that is wider than the first imaging range, and that captures images of rear lateral sides of a vehicle;
a display section that displays, on a display surface, an image captured by the imaging section;
an operation section that can operate the vehicle so as to advance forward or travel rearward; and
a display control section that, in a case in which the brightness measured by the measuring section is less than or equal to a set threshold value, and the vehicle is operated by the operation section so as to travel rearward, switches the imaging range of the imaging section to the second imaging range, and makes a luminous intensity of a dark portion, which is a portion within the display surface of an image displayed on the display surface and whose luminous intensity is lower than a set luminous intensity, be higher than a luminous intensity of the dark portion before the vehicle travels rearward
wherein,
in a case in which the brightness measured by the measuring section is less than or equal to the set threshold value, and the vehicle is operated by the operation section so as to travel rearward, the display control section makes a light sensitivity of a light receiving portion that corresponds to the dark portion at the imaging section be higher than a light sensitivity of the light receiving portion that corresponds to the dark portion before the vehicle travels rearward, and
in a case in which the brightness measured by the measuring section is less than or equal to the threshold value, and the vehicle is operated by the operation section so as to not travel rearward, the display control section makes the light sensitivity of the light receiving portion that corresponds to the dark portion at the imaging section be higher than the light sensitivity of the light receiving portion that corresponds to the dark portion when the brightness is more than the threshold value.

2. The electronic mirror system of claim 1, wherein, in a case in which the brightness measured by the measuring section is less than or equal to the set threshold value, and the vehicle is operated by the operation section so as to travel rearward, the display control section corrects information of a first luminous intensity of the dark portion before the vehicle travels rearward, to information of a second luminous intensity of the dark portion such that the second luminous intensity becomes higher than the first luminous intensity, and thereafter, outputs corrected information to the display section.

3. The electronic mirror system of claim 1, wherein, in a case that is at least one of a case in which the brightness measured by the measuring section is greater than the set threshold value or a case in which the vehicle is operated by the operation section so as to travel in a direction other than rearward, the display control section carries out control so as to make the imaging range of the imaging section be the first imaging range and such that luminous intensity of the image displayed on the display surface is maintained as is.

4. The electronic mirror system of claim 1, wherein the measuring section measures the brightness based on an average value of amounts of light incident from outside the vehicle.

5. An electronic mirror system comprising:
an illuminance meter that measures a brightness of a vehicle exterior;
a camera that captures images of a rear lateral side of a vehicle, wherein the camera includes a light sensitivity portion;
a display that displays, on a display surface, an image captured by the camera;
a shift that can operate the vehicle so as to advance forward or travel rearward; and
an electronic control unit (ECU) including a processor programmed to:
switch an imaging range of the image captured by the camera, between a first imaging range and a second imaging range that is wider than the first imaging range,
in a case in which the brightness is more than a set threshold value, set a light sensitivity of the light receiving portion of the camera, which corresponds to a dark portion of the image, to a first value, wherein the dark portion is a portion of the image displayed on the display surface whose luminous intensity is lower than a set luminous intensity,
in a case in which the brightness is less than or equal to the set threshold value: determine whether the vehicle is operated so as to travel rearward, and
 (i) in a case in which the vehicle is operated so as not to travel rearward, set the light sensitivity of the light receiving portion of the camera, which corresponds to the dark portion of the image, to a second value that is higher than the first value, and
 (ii) in a case in which the vehicle is operated so as to travel rearward, switch the imaging range of the image to the second imaging range and set the light sensitivity of the light receiving portion of the camera, which corresponds to the dark portion of the image, to a third value that is higher than the second value.

* * * * *